(12) United States Patent
Kim et al.

(10) Patent No.: US 8,518,579 B2
(45) Date of Patent: Aug. 27, 2013

(54) RECHARGEABLE BATTERY HAVING ANTI-VIBRATION MEMBER

(75) Inventors: Yong-Sam Kim, Yongin-si (KR); Sung-Bae Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/595,851

(22) Filed: Aug. 27, 2012

(65) Prior Publication Data

US 2012/0321922 A1    Dec. 20, 2012

Related U.S. Application Data

(63) Continuation of application No. 12/761,058, filed on Apr. 15, 2010, now Pat. No. 8,268,478.

(60) Provisional application No. 61/234,561, filed on Aug. 17, 2009.

(51) Int. Cl.
*H01M 2/10* (2006.01)
(52) U.S. Cl.
USPC .......................................... 429/186; 429/246
(58) Field of Classification Search
USPC .................................. 429/122–347, 186, 246
See application file for complete search history.

(56) References Cited

U.S. PATENT DOCUMENTS

| 4,495,259 A | 1/1985 | Uba | |
| 8,268,478 B2 * | 9/2012 | Kim et al. | 429/186 |
| 2004/0191612 A1 | 9/2004 | Akita et al. | |
| 2006/0024578 A1 | 2/2006 | Lee | |
| 2006/0057459 A1 * | 3/2006 | Kwon et al. | 429/174 |
| 2006/0115722 A1 | 6/2006 | Kim | |
| 2011/0045344 A1 | 2/2011 | Kim | |

FOREIGN PATENT DOCUMENTS

| CN | 1728432 A | 2/2006 |
| CN | 1783534 A | 6/2006 |
| JP | 2000-215877 | 8/2000 |
| JP | 2004-303500 A | 10/2004 |
| JP | 2006-40901 A | 2/2006 |
| JP | 2006-156401 A | 6/2006 |
| KR | 2006/022355 A | 3/2006 |

OTHER PUBLICATIONS

European Search Report dated Oct. 6, 2010 for European Application 10164568.7-2119, 5 pages.
European Office Action dated Jun. 17, 2011, for corresponding European Patent Application 10164568.7, 3 pages.

(Continued)

*Primary Examiner* — Basia Ridley
*Assistant Examiner* — Jonathan G Leong
(74) *Attorney, Agent, or Firm* — Christie, Parker & Hale, LLP (57) ABSTRACT

A rechargeable battery that improves an anti-vibration property is provided. The rechargeable battery includes: an electrode assembly including a positive electrode, a negative electrode, and a separator that is disposed between the positive electrode and the negative electrode, a case that houses the electrode assembly, and a cap assembly including terminals that are coupled to the case and that are electrically connected to the electrode assembly, wherein the terminal has a lead tab that is electrically connected to the electrode assembly and an anti-vibration member is installed between the lead tab and the case.

18 Claims, 8 Drawing Sheets

(56) References Cited

OTHER PUBLICATIONS

Machine Translation of KR 10-2006-0022355 originally published on Mar. 2006 to Lee.
SIPO Office action dated Feb. 16, 2013, for corresponding Chinese Patent application 201010256945.1, with English translation, (19 pages).
English Machine Translation of JP 2004-303500 A, 10 pages.
English Machine Translation of JP 2006-040901 A, 10 pages.
Japanese Office Action dated Oct. 30, 2012 issued in Japanese Application 2010-174476, 3 pages.
European Office Action for application No. 10 164 568.7-1360 dated Mar. 11, 2013, 3 pages.

\* cited by examiner

RECHARGEABLE BATTERY HAVING ANTI-VIBRATION MEMBER

CROSS-REFERENCE TO RELATED APPLICATIONS

This application is a continuation application of U.S. Ser. No. 12/761,058 filed Apr. 15, 2010, in the United States Patent Office, which claims priority to U.S. Provisional Patent application Ser. No. 61/234,561, filed Aug. 17, 2009, the entire contents of which are incorporated herein by reference.

BACKGROUND

1. Field

The described technology relates generally to a rechargeable battery having a member that can absorb vibration and an impact.

2. Description of the Related Art

A rechargeable battery can be discharged and recharged, unlike a primary battery that cannot be recharged. A low capacity rechargeable battery is often used for a small portable electronic device such as a mobile phone, a laptop computer, and a camcorder, and a large capacity rechargeable battery is often used as a power source for driving a motor such as for a hybrid vehicle.

Further a high power rechargeable battery module that uses a high energy density of non-aqueous electrolyte has been developed, and in such a high power rechargeable battery, a plurality of rechargeable batteries for driving a device requiring large electric power, for example, a motor such as an electric vehicle are coupled in series.

Further, a high power rechargeable battery module is formed with a plurality of rechargeable batteries that are generally coupled in series, and the rechargeable battery may be formed in a cylindrical shape and a quadrangular shape.

The quadrangular shape rechargeable battery includes an electrode assembly in which a positive electrode and a negative electrode are positioned with a separator disposed therebetween, a case having a space that houses the electrode assembly, a cap plate that closes and seals the case and having a terminal hole through which a terminal is inserted, and a terminal that is electrically connected to the electrode assembly and that is inserted into the terminal hole to protrude to the outside of the case.

The terminal is electrically connected to the electrode assembly through a lead tab, and the lead tabs are each fixed to the terminal and the electrode assembly. Due to an external vibration or impact, a contact between the lead tab and the electrode assembly and/or a contact between the lead tab and the terminal may become disrupted or ineffective.

Such a problem frequently occurs in a rechargeable battery that is applied to an object that continuously vibrates, such as an electric vehicle (EV) and a hybrid electric vehicle (HEV).

When a contact between the lead tab and the terminal or the electrode assembly becomes disrupted, an output of the rechargeable battery is deteriorated and much resistance heat occurs in a contact portion thereof. When much heat occurs within the case, an abnormal reaction such as decomposition of an electrolyte solution occurs within the case, and thus the rechargeable battery may explode or ignite.

Further, when the electrode assembly does not contact the case for insulation and is suspended to the lead tab, if an external vibration or impact occurs, all loads are concentrated to the terminal and thus the terminal may be deformed or cut.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having improved durability against vibration and impact.

An exemplary embodiment of the present invention provides a rechargeable battery including: an electrode assembly including a positive electrode, a negative electrode, and a separator that is disposed between the positive electrode and the negative electrode, a case that houses the electrode assembly, and a cap assembly including terminals that are coupled to the case and that are electrically connected to the electrode assembly, wherein the terminal has a lead tab that is electrically connected to the electrode assembly and an anti-vibration member installed between the lead tab and the case.

The anti-vibration member has a first support part that is installed between the case and the lead tab and a second support part that is installed between the lead tab and the electrode assembly to be supported to the lead tab.

According to an exemplary embodiment of the present invention, as the anti-vibration member is installed in the terminal, a terminal can be prevented from shaking due to an external vibration or impact.

[Description of Reference Numerals Indicating Primary Elements in the Drawings]

| | |
|---|---|
| 100: rechargeable battery | 10: electrode assembly |
| 11: positive electrode | 12: negative electrode |
| 13: separator | 20: cap assembly |
| 21: positive terminal | 22: negative terminal |
| 21a, 22a: flange | 21b, 22b: lower protrusion |
| 30: cap plate | 34: case |

-continued

[Description of Reference Numerals Indicating Primary Elements in the Drawings]

| | |
|---|---|
| 40, 50: lead tab | 51: terminal junction part |
| 51a: terminal hole | 52: side plate |
| 53: electrode assembly junction part | 54: vent hole |
| 56: anti-vibration hole | 60: anti-vibration member |
| 61: second support part | 62: connecting bar |
| 65: first support part | |

DETAILED DESCRIPTION

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the specification and drawings, like reference numerals designate like elements.

Figure 1:
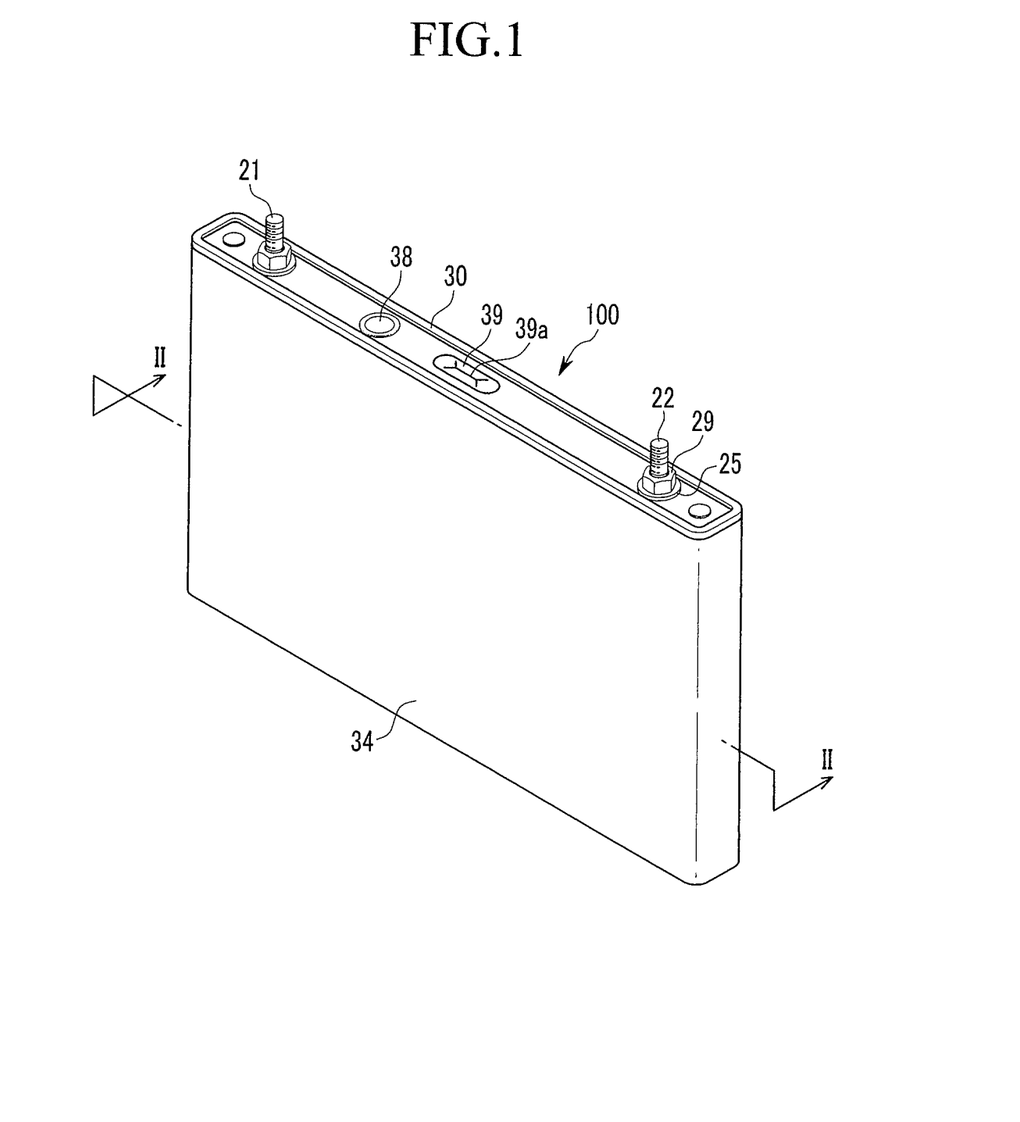
FIG. 1 is a perspective view illustrating a rechargeable battery according to an exemplary embodiment of the present invention.
Figure 2:
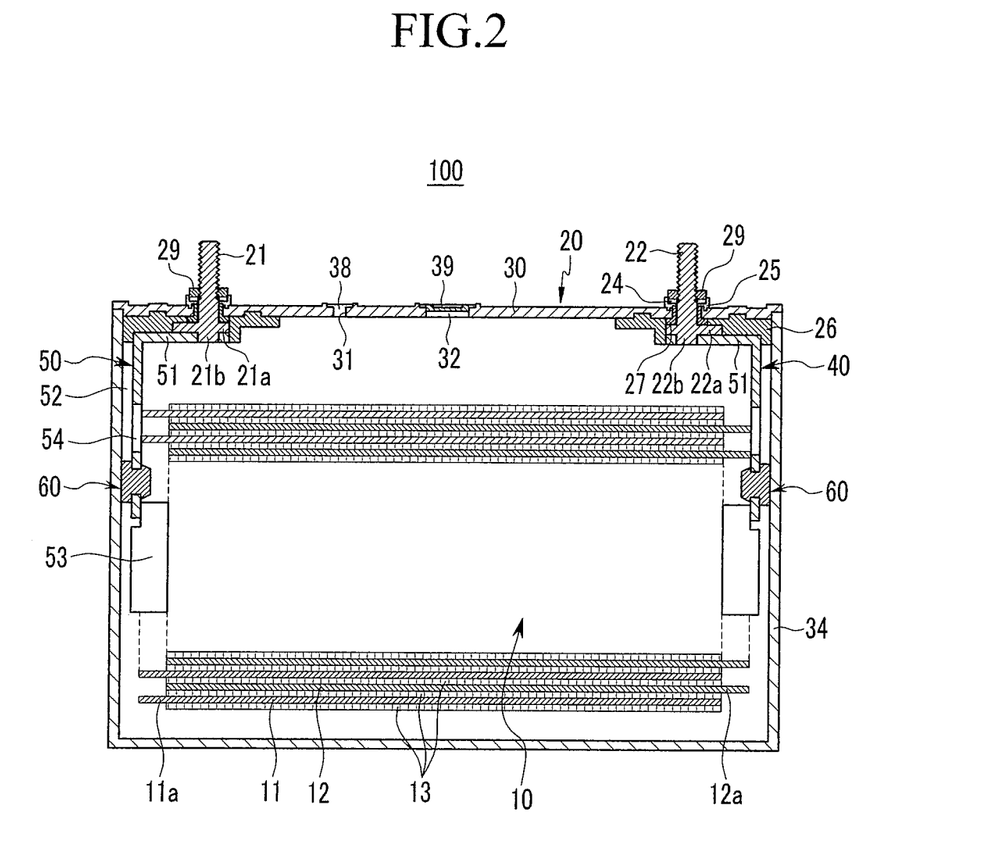
FIG. 2 is a cross-sectional view of the rechargeable battery taken along line II-II of FIG. 1.

FIG. 1 is a perspective view illustrating a rechargeable battery according to an exemplary embodiment of the present invention, and FIG. 2 is a cross-sectional view of the rechargeable battery taken along line II-II of FIG. 1.

Referring to FIGS. 1 and 2, a rechargeable battery 100 according to the present exemplary embodiment includes an electrode assembly 10 that is spiral-wound by locating a separator 13, which is an insulator, between a positive electrode 11 and a negative electrode 12, a case 34 that houses the electrode assembly 10, and a cap assembly 20 that is coupled to an opening of the case 34.

The rechargeable battery 100 according to the present exemplary embodiment is a lithium ion rechargeable battery and has a quadrangular shape. However, the present invention is not limited thereto, and the present invention can be applied to various forms of batteries such as a lithium polymer battery or a cylindrical battery.

The positive electrode 11 and the negative electrode 12 each include a coating region, which is a region that is coated with an active material, and uncoated regions 11a and 12a, which are regions that are not coated with an active material, in a current collector that is formed with a thin plate of metal foil. The positive uncoated region 11a is formed at one side end of the positive electrode 11 along a length direction of the positive electrode 11, and the negative uncoated region 12a is formed at the other side end of the negative electrode 12 along a length direction of the negative electrode 12. The positive electrode 11 and the negative electrode 12 are spiral-wound with a separator 13, which is an insulator, located therebetween.

However, the present invention is not limited thereto, and the electrode assembly 10 may be formed in a structure in which a positive electrode and a negative electrode that are formed with a plurality of sheets are alternately stacked with a separator located therebetween.

The case 34 forms substantially an entire external portion of the rechargeable battery 100 and is formed with a conductive metal such as aluminum, aluminum alloy or nickel-plated steel. Further, the case 34 provides a space that houses the electrode assembly 10. For example, the case 34 may be formed in a cuboid quadrangular shape having an opening at one side thereof in order to house a substantially cuboid electrode assembly 10. The opening faces upward in the case 34 shown in FIGS. 1 and 2.

The cap assembly 20 includes a cap plate 30 that covers the opening of the case 34, a positive terminal 21 that protrudes to the outside of the cap plate 30 and that is electrically connected to the positive electrode 11, and a negative terminal 22 that is electrically connected to the negative electrode 12.

The cap plate 30 is formed as a thin plate and is coupled to the opening of the case 34. A seal stopper 38 is installed in an electrolyte injection opening 31 of the cap plate 30, and a vent member 39 having a notch 39a adapted to fracture at a threshold pressure is installed in a vent hole 32.

The positive terminal 21 and the negative terminal 22 penetrate through the cap plate 30, and flanges 21a and 22a that are supported in a lower part of the cap plate 30 are formed in lower parts of the positive terminal 21 and the negative terminal 22 respectively. A thread is formed on an external circumferential surface of the positive and negative terminals 21, 22 that protrude to the outside of the cap plate 30. Further, a nut 29 that supports an upper part of the positive and negative terminals is fastened to the terminals 21 and 22. A washer 24 that buffs a fastening force of the nut 29 is installed in a lower part of the nut 29 between the nut end and the cap plate 30.

In the present exemplary embodiment, the terminals 21 and 22 are fixed through the nut 29. However the present invention is not limited thereto, and the terminals 21 and 22 may be formed in a rivet structure or fixed by welding.

A lower gasket 27 and an upper gasket 25 are installed between each of the terminals 21 and 22 and the cap plate 30, the lower gasket 27 being positioned between the flanges 21a and 22a and the cap plate 30, and the upper gasket 25 being positioned between the cap plate 30 and the washer 24.

The positive terminal 21 includes a positive lead tab 50 that is bonded to a positive uncoated region 11a by welding, and the negative terminal 22 includes a negative lead tab 40 that is bonded to a negative uncoated region 12a by welding. Lower protrusions 21b and 22b are formed in a lower part of the flanges 21a and 22a, and the lead tabs 40 and 50 are fixed to the lower protrusions 21b and 22b by welding. However, the present invention is not limited thereto and a terminal and a lead tab may be integrally formed.

A lower insulation member 26 is installed between the terminals 21 and 22 and the cap plate 30, and an upper end of the lead members 40 and 50 and the flanges 21a and 22a of the terminals 21 and 22 are inserted into a groove that is formed in the lower insulation member 26.

Figure 3:
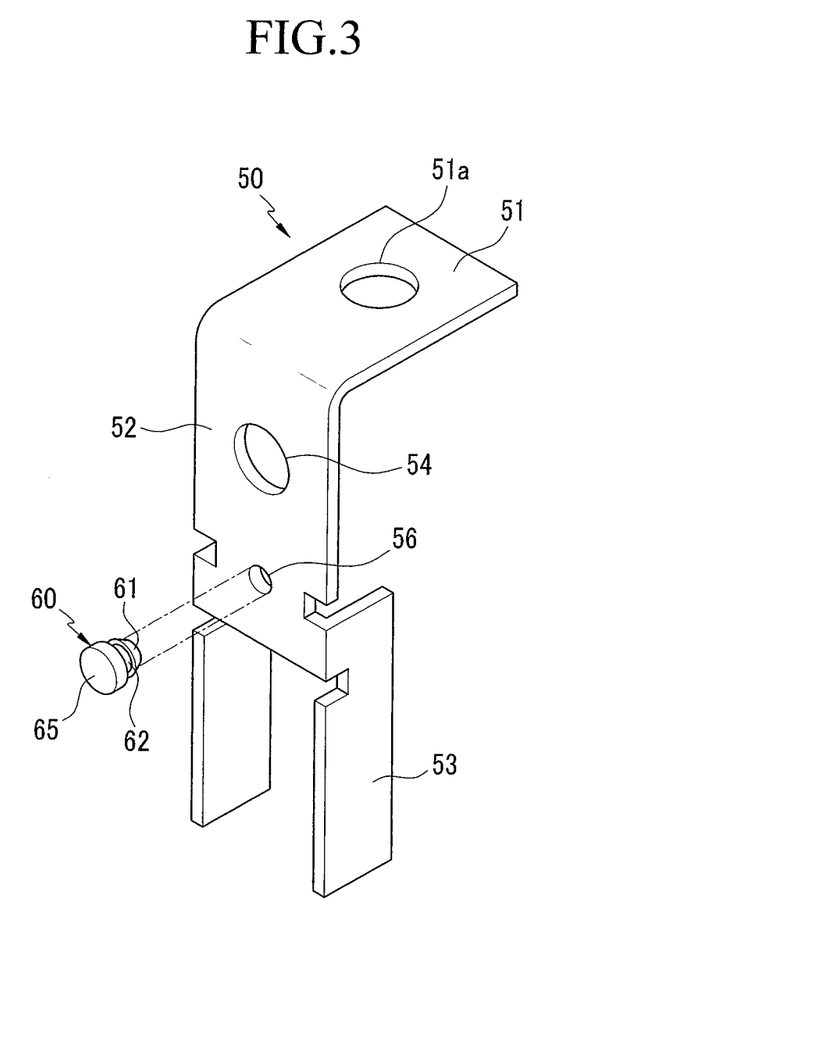
FIG. 3 is an exploded perspective view illustrating a lead tab and an anti-vibration member according to a first exemplary embodiment of the present invention.

FIG. 3 is an exploded perspective view illustrating a lead tab and an anti-vibration member according to a first exemplary embodiment of the present invention.

Referring to FIGS. 2 and 3, the lead tab and the anti-vibration member are described in detail.

Because the negative lead tab 40 has substantially the same structure as that of the positive lead tab 50, only the positive lead tab 50 will be described in detail.

The positive lead tab 50 includes a terminal junction part 51 in which a terminal hole 51a adapted to receive the lower protrusion 21b is formed, a side plate 52 extending from the terminal junction part 51 and positioned between a side section of the electrode assembly 10 and the case 34, and an electrode assembly junction part 53 extending from the side plate 52 and attached to the positive uncoated region 11a by welding. The side plate 52 is bent orthogonally from the terminal junction part 51.

A vent hole 54 that moves a gas generated within the electrode assembly 10 to an upper part of the case 34' is formed in the side plate 52. Two electrode assembly junction parts 53 are formed extending from the side plate 52 and are bent from the side plate 52 to be parallel to a wide surface of the uncoated regions 11a and 12a.

The electrode assembly junction part 53 is formed toward the bottom of the case 34 from both side ends of the side plate 52 and is attached to both side surfaces of the positive uncoated region 11a by ultrasonic welding.

A structure of the positive lead tab 50 is an exemplary illustration, but the present invention is not limited thereto. The positive lead tab 50 is formed to electrically connect a terminal and an electrode assembly.

An anti-vibration member hole (or spacer opening) 56 is formed in the side plate 52, the anti-vibration hole 56 being disposed at a lower part of the vent hole 54, and an anti-vibration member (or spacer) 60 is inserted into the anti-vibration hole 56. The anti-vibration member 60 is made of a polymer having elasticity in order to absorb an external impact.

The anti-vibration member 60 includes a first support part 65 that is positioned between the side plate 52 and an inner surface of the case 34, a second support part 61 that passes through the anti-vibration hole 56 and that supports the first support part 65 in a surface opposite to a surface at which the first support part 65 is positioned, and a connecting bar 62 that connects the first support part 65 and the second support part 61 and that is inserted into the anti-vibration hole 56. In this case, the second support part 61 is positioned between the side plate 52 and the electrode assembly 10.

The first support part 65 is formed in an approximately circular cylinder shape and closely contacts the side plate 52 and an inner surface of the case 34. The first support part 65 is inserted by tight fit between the side plate 52 and the case 34 in order to stably support the electrode assembly 10 and the terminal 21.

The second support part 61 is formed in a truncated circular cone shape such that a cross-section area of one side end thereof is formed smaller than that of an area of the anti-vibration hole 56, and a cross-section area of a portion contacting with the connecting bar 62 is formed greater than that of an area of the anti-vibration hole 56. Accordingly, an edge of the second support part 61 functions as a latch jaw, and the second support part 61 easily passes through the anti-vibration hole 56 and stably supports the anti-vibration member 60 at one side thereof.

When the second support part 61 is supported between the electrode assembly 10 and the side plate 52 and the first support part 65 is supported between the side plate 52 and the case 34, the anti-vibration member 60 is stably fixed to the side plate 52. A spacer that is simply installed between the positive lead tab 50 and the case 34 and the anti-vibration member 60 according to the present exemplary embodiment are completely different in a structure and a function. Even if the spacer is installed, the electrode assembly 10 and the terminals 21 and 22 may be shaken at a minute vibration or impact. However, when the anti-vibration member 60 is stably fixed to the side plate 52 and the first support part 65 is tightly fit between the side plate 52 and an inner side surface of the case 34, the electrode assembly 10 and the terminals 21 and 22 are stably supported.

The connecting bar 62 is formed in a circular bar shape. However, the connecting bar 62 may also be formed in various structures such as a triangular bar and a quadrangular bar according to a shape of the anti-vibration hole 56.

As in the present exemplary embodiment, if the anti-vibration member 60 is installed in the positive lead tab 50 and the negative lead tab 40, the anti-vibration member 60 supports the terminals 21 and 22, respectively, and the electrode assembly 10 at both side ends of the electrode assembly 10, and thus the terminals 21 and 22 or the electrode assembly 10 can be prevented from being dislodged or moved with respect to the case by an external impact or vibration. Accordingly, an electrical contact between the terminals 21 and 22 and the electrode assembly 10 can be stably maintained and the lead tabs 40 and 50 can be prevented from being deformed.

Figure 4:
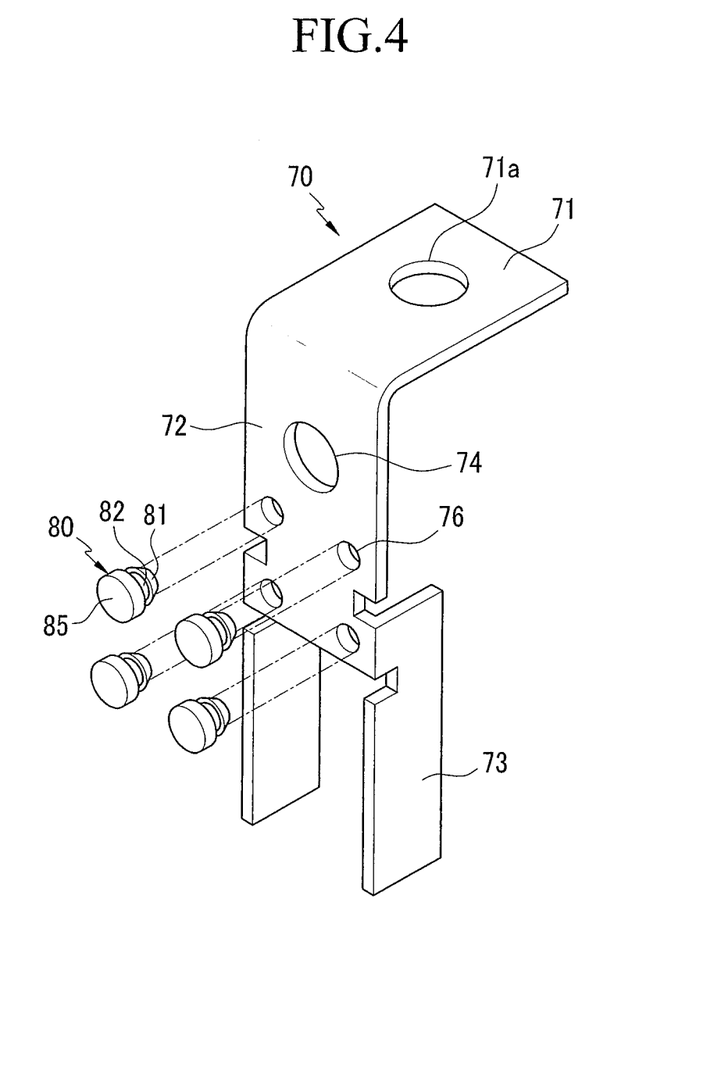
FIG. 4 is an exploded perspective view illustrating a lead tab and an anti-vibration member according to a second exemplary embodiment of the present invention.

FIG. 4 is an exploded perspective view illustrating a lead tab and an anti-vibration member according to a second exemplary embodiment of the present invention.

Referring to FIG. 4, a lead tab 70 according to the present exemplary embodiment includes a terminal junction part 71 in which a terminal hole 71a adapted to receive a lower protrusion 21b is formed, a side plate 72 extending from a lower part of the terminal junction part 71 and positioned between a side section of an electrode assembly 10 and a case 34, and an electrode assembly junction part 73 extending from the side plate 72 and that is attached to a positive uncoated region by welding.

A vent hole 74 adapted to discharge a gas and a plurality of anti-vibration holes 76 each adapted to receive an anti-vibration member 80 are formed in the side plate 72. In the present exemplary embodiment, four anti-vibration holes 76 are formed in the side plate 72, and four anti-vibration members 80 are installed in the side plate 72. However, the present invention is not limited thereto and more or fewer than four anti-vibration holes 76 may be formed.

The anti-vibration member 80 is made of a polymer having elasticity in order to absorb an external impact. The anti-vibration member 80 includes a first support part 85 positioned between the side plate 72 and an inner surface of the case 34, a second support part 81 that passes through the anti-vibration hole 76 and that supports the first support part 85 on a surface opposite to a surface on which the first support part 85 is positioned, and a connecting bar 82 that connects the first support part 85 and the second support part 81 and that is inserted into the anti-vibration hole 76.

As in the present exemplary embodiment, when a plurality of anti-vibration members 80 are installed in the side plate 72, an impact is absorbed at a plurality of locations and thus durability against an impact and vibration is further improved. Further, when the anti-vibration member 80 is tightly fit between the lead tab 70 and the case 34, the anti-vibration member 80 supports the electrode assembly 10 and the terminals 21 and 22 in all directions by a friction force.

Figure 5:
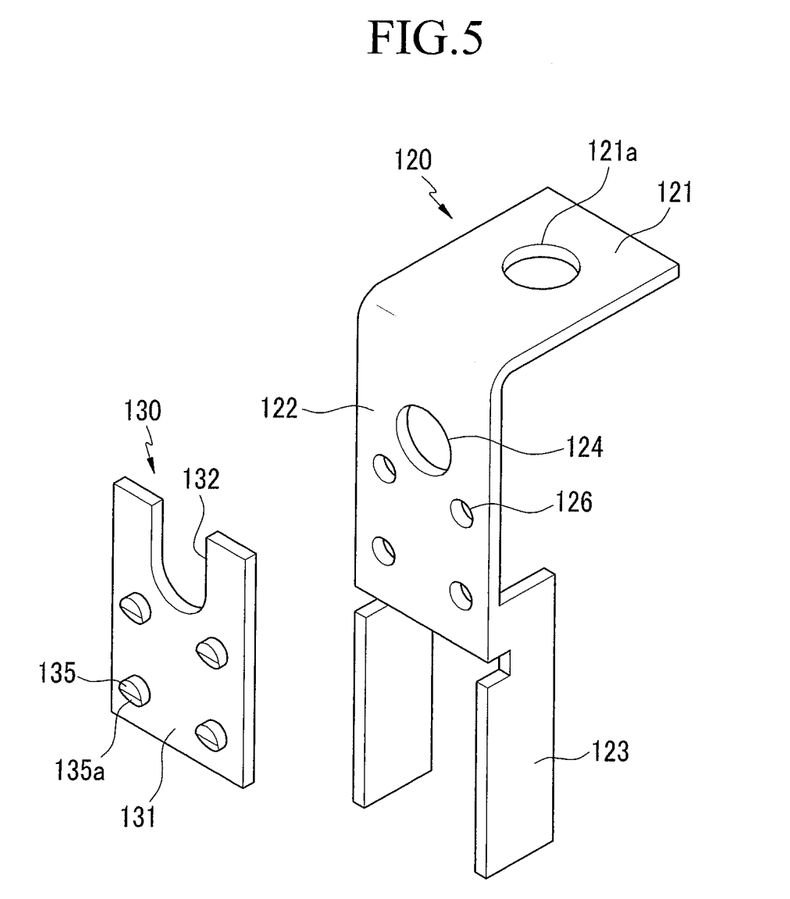
FIG. 5 is an exploded perspective view illustrating a lead tab and an anti-vibration member according to a third exemplary embodiment of the present invention.
Figure 6:
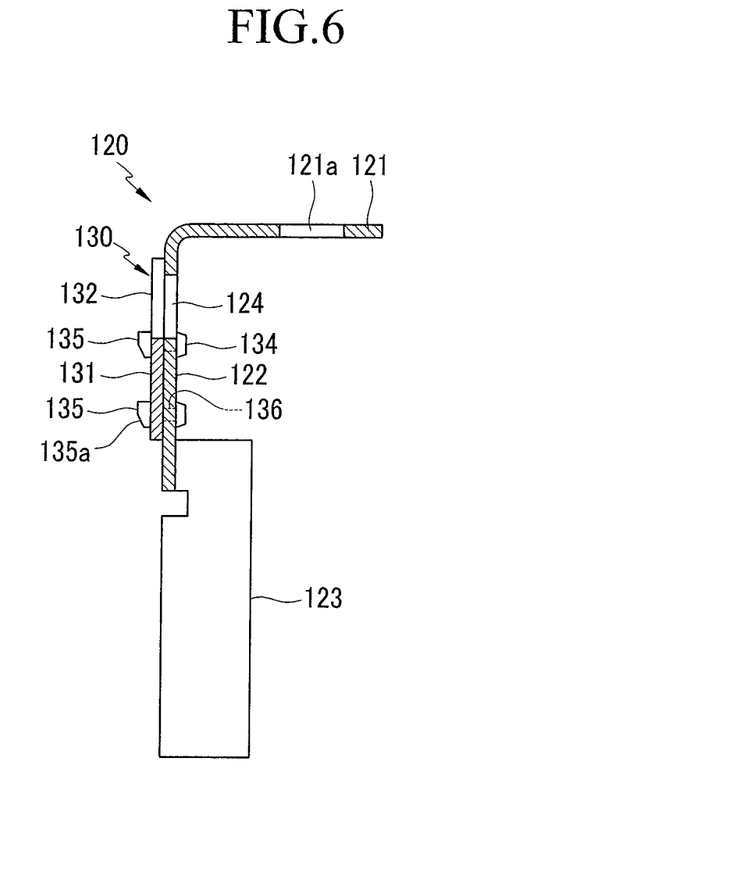
FIG. 6 is a vertical cross-sectional view illustrating the anti-vibration members shown in FIG. 5 coupled to the lead tab.

FIG. 5 is an exploded perspective view illustrating a lead tab and an anti-vibration member according to a third exemplary embodiment of the present invention, and FIG. 6 is a vertical cross-sectional view illustrating a coupled state of members that are shown in FIG. 5.

Referring to FIGS. 5 and 6, a lead tab 120 according to the present exemplary embodiment includes a terminal junction part 121 in which a terminal hole 121a adapted to receive a lower protrusion 21b is formed, a side plate 122 that is formed extending from the terminal junction part 121 and that is positioned between a side section of an electrode assembly 10 and a case 34, and an electrode assembly junction part 123 extending from the side plate 122 and that is attached to a positive uncoated region by welding.

A vent hole 124 adapted to discharge a gas and a plurality of anti-vibration holes 126 each adapted to receive an anti-vibration member 130 are formed in the side plate 122.

The anti-vibration member 130 is made of a polymer having elasticity in order to absorb an external impact. The anti-vibration member 130 includes a base plate 131, a first support part 135 that protrudes toward the case 34 from the base plate 131, a second support part 134 that passes through the anti-vibration hole 126 and that is positioned between the side plate 122 and the electrode assembly 10, and a connecting bar 136 that is positioned between the base plate 131 and the second support part 134 and that is inserted into the anti-vibration hole 126.

Further, an exhaust groove 132 that easily discharges a gas in a portion corresponding to the vent hole 124 is formed in the anti-vibration member 130. The exhaust groove 132 extends centrally from an upper end of the anti-vibration member 130 to allow a gas that is discharged through the vent hole 124 to easily move to an upper part of the case 34.

The first support part 135 is formed in an approximately circular cylindrical shape and protrudes toward an inner side wall of the case 34 from the base plate 131. In one embodiment, a plurality of first support parts 135 are formed in the base plate 131, and the first support part 135 is formed in an upper part of the base plate 131 and is formed in a lower part of a surface that is parallel to a side wall of the case 34 and has an inclined surface 135a that has a reduced height as advancing toward an end portion from the center thereof, i.e. the inclined surface generally faces toward the bottom of the case 34.

When the inclined surface 135a is formed in this way, when the anti-vibration member 130 is installed in the lead tab 120, when the lead tab is inserted into the case 34, the anti-vibration member 130 can be easily inserted even when a tight fit is formed with an inner side wall of the case 34.

The second support part 134 is formed in an approximately truncated circular cone shape and an edge thereof is latched at one side of the side plate 122 to support the anti-vibration member 130. The second support parts 134 are formed with the same number as that of the anti-vibration holes 126 to pass through the anti-vibration hole 126.

As in the present exemplary embodiment, when a plurality of first support parts 135 and second support parts 134 are formed in the base plate 131, the anti-vibration member 130 is easily installed, and a plurality of second support parts 134 absorb vibration and impact, and thus durability against impact and vibration is improved.

Figure 7:
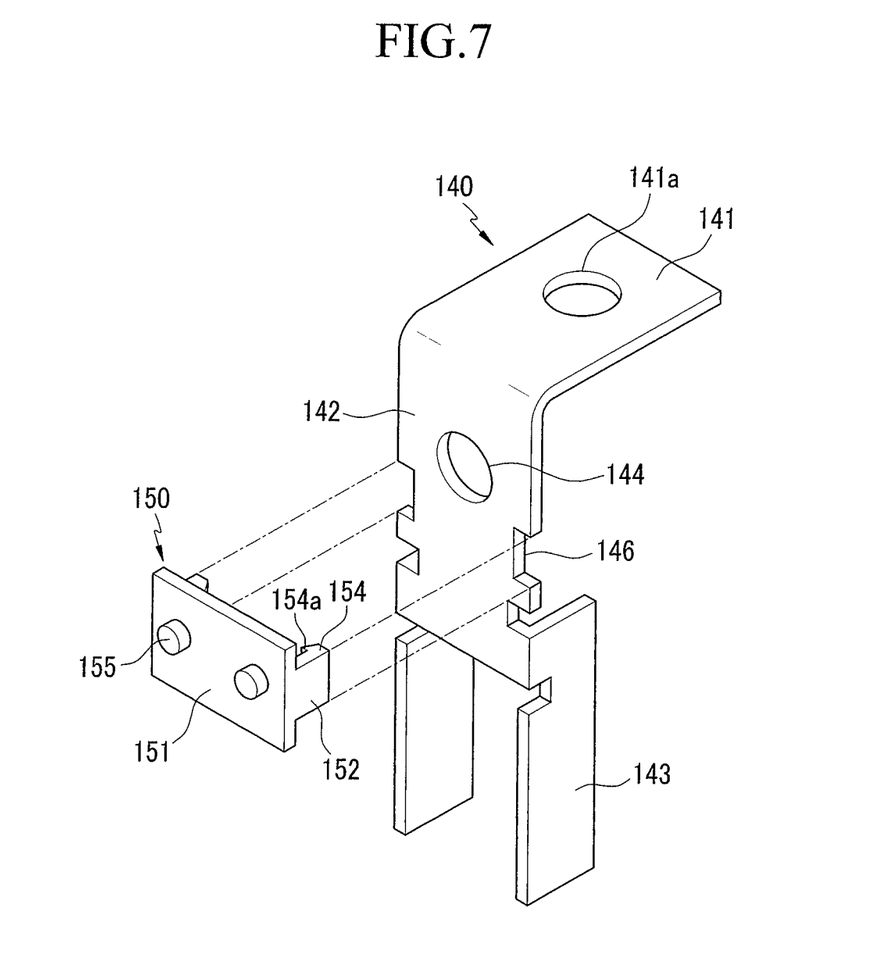
FIG. 7 is an exploded perspective view illustrating a lead tab and an anti-vibration member according to a fourth exemplary embodiment of the present invention.
Figure 8:
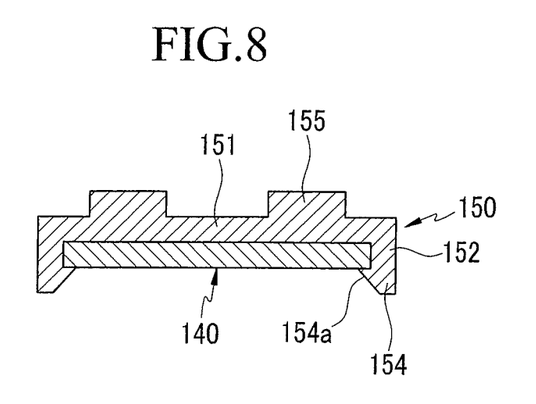
FIG. 8 is a transverse cross-sectional view illustrating the anti-vibration member of the fourth exemplary embodiment shown in FIG. 7 coupled to the lead tab.

FIG. 7 is an exploded perspective view illustrating a lead tab and an anti-vibration member according to a fourth exemplary embodiment of the present invention, and FIG. 8 is a transverse cross-sectional view illustrating a coupled state of the anti-vibration member shown in FIG. 7.

Referring to FIGS. 7 and 8, a lead tab 140 according to the present invention exemplary embodiment includes a terminal junction part 141 in which a terminal hole 141a adapted to receive a lower protrusion 21b is formed, a side plate 142 extending from the terminal junction part 141 and positioned between a side section of the electrode assembly 10 and the case 34, and an electrode assembly junction part 143 extending from the side plate 142 and attached to a positive uncoated region by welding.

A vent hole 144 adapted to discharge a gas and an anti-vibration groove 146 adapted to receive an anti-vibration member 150 are formed in the side plate 142. The anti-vibration grooves 146 are formed along both side edges of the side plate 142 and have a structure that is cut toward the center from the side edges.

The anti-vibration member 150 is made of a polymer having elasticity in order to absorb an external impact. The anti-vibration member 150 includes a base plate 151, a first support part 155 that protrudes toward the case 34 from the base plate 151, a second support part 154 that passes through the anti-vibration groove 146 and supported between the side plate 142 and the electrode assembly 10, and a connecting bar 152 positioned between the base plate 151 and the second support part 154 and inserted into the anti-vibration groove 146.

In the present exemplary embodiment, the anti-vibration groove 146 is formed in the side plate 142, and the second support part 154 is installed through the anti-vibration groove 146. However, the present invention is not limited thereto, and the anti-vibration groove 146 does not have to be formed in the side plate 142. Rather, the second support part 154 may be installed on both side edges of the side plate 142 and may be supported by the side edges without the need for the anti-vibration grooves 146.

The first support part 155 is formed in an approximately circular cylindrical shape and protrudes toward an inner side wall of the case 34 from the base plate 151. A plurality of first support parts 155 are formed in the base plate 151, and an end portion of each first support part 155 is formed parallel to a side wall of the case 34.

The second support part 154 is formed in a wedge shape and has a latch jaw 154a at one side thereof. Accordingly, the second support part 154 can stably support the anti-vibration member 150 against a surface of the side plate 142 advancing toward a direction opposite to that of a surface against which the base plate 151 is positioned.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising a positive electrode, a negative electrode, and a separator between the positive electrode and the negative electrode;
a case housing the electrode assembly;
a cap assembly coupled to the case;
a terminal;
a lead tab electrically coupling the terminal to the electrode assembly; and
a spacer adapted to absorb an impact or vibration, the spacer being coupled to the lead tab and being at least partially located between the lead tab and the case, wherein the lead tab has an anti-vibration groove or hole adapted to receive a latch of the spacer.

2. The rechargeable battery of claim 1, wherein the lead tab comprises a side plate having the anti-vibration groove or hole.

3. The rechargeable battery of claim 2, wherein the side plate has a vent opening configured to allow gas generated by the electrode assembly to exit the case.

4. The rechargeable battery of claim 2, wherein the side plate has a first surface and a second surface, and
wherein the spacer is inserted into the anti-vibration groove or hole such that first and second portions of the spacer extend in opposite directions from the first surface and the second surface, respectively.

5. The rechargeable battery of claim 1, wherein the spacer comprises at least one first support between the case and the lead tab, and at least one second support between the lead tab and the electrode assembly.

6. The rechargeable battery of claim 5, wherein the at least one first support is cylindrically shaped and extends toward an inner side wall of the case.

7. The rechargeable battery of claim 5, wherein the at least one second support is received by the anti-vibration groove or hole.

8. The rechargeable battery of claim 5, wherein the spacer further comprises a plurality of first supports located between the case and the lead tab, and a plurality of second supports located between the lead tab and the electrode assembly.

9. The rechargeable battery of claim 8, wherein the spacer further comprises a base plate engaging each of the plurality of first supports and each of the plurality of second supports.

10. The rechargeable battery of claim 9, wherein the base plate comprises the latch.

11. The rechargeable battery of claim 10, wherein the anti-vibration groove or hole of the lead tab is adapted to engage the latch, and
wherein the latch has a wedge shape.

12. The rechargeable battery of claim 1, wherein the spacer comprises an insulating material.

13. The rechargeable battery of claim 1, wherein the spacer comprises an elastic material.

14. The rechargeable battery of claim 13, wherein the elastic material is a polymer.

15. The rechargeable battery of claim 1, wherein the lead tab comprises:

a side plate having the anti-vibration groove or hole for receiving the spacer; and
a terminal junction part extending substantially orthogonally from a first end of the side plate and having a terminal opening adapted to receive the terminal.

16. The rechargeable battery of claim 1, wherein the spacer contacts an inner surface of the case.

17. The rechargeable battery of claim 1, wherein the spacer contacts an inner surface of the case opposite the electrode assembly.

18. A rechargeable battery comprising:
an electrode assembly comprising a positive electrode, a negative electrode, and a separator between the positive electrode and the negative electrode;
a case housing the electrode assembly;
a cap assembly coupled to the case;
a terminal;
a lead tab electrically coupling the terminal to the electrode assembly; and
a spacer adapted to absorb an impact or vibration, the spacer including a latch to stably support the spacer against the lead tab, wherein the lead tab has an anti-vibration groove or hole adapted to receive the latch of the spacer.

* * * * *